April 25, 1967 W. M. TASKEY 3,316,043
DENTAL OPERATORY UNIT
Filed June 1, 1965 5 Sheets-Sheet 1

INVENTOR.
W. MELVIN TASKEY
BY Edward Cundy Bishop

April 25, 1967 W. M. TASKEY 3,316,043
DENTAL OPERATORY UNIT
Filed June 1, 1965 5 Sheets-Sheet 2

INVENTOR.
W. MELVIN TASKEY
BY

United States Patent Office 3,316,043
Patented Apr. 25, 1967

3,316,043
DENTAL OPERATORY UNIT
William Melvin Taskey, 15219 83rd Ave.,
Edmonton, Alberta, Canada
Filed June 1, 1965, Ser. No. 460,208
1 Claim. (Cl. 312—209)

This invention relates to improvements in dental operatory units and to the use of such units.

Equipment used in present day dental offices usually consists of a patient's chair, some form of stool on which the dentist may be seated, various cabinets that may or may not be movable into a position near the dentist as well as some form of pedestal unit on which are mounted various drills, suction devices and other mechanical implements necessary in dental work.

One of the problems in dental offices is that the various pieces of equipment required by the dentist and various supply cabinets are not always within easy reach of the dentist or his assistant with the result that it is not uncommon for the dentist to be subjected to considerable abnormal body twisting and straining when obtaining these supplies or instruments during the day's work.

There is also a problem in that conventional design of dental equipment invariably results in a jungle of equipment and cords that are in full view of the patient during dental work and which may contribute to the psychological fear present in the minds of many dental patients.

A further difficulty is that it is usually necessary to make considerable structural changes in an office prior to the placement of conventional dental equipment so that proper supplies of air and power as well as sewage outlets are available.

In addition, dental offices particularly for the beginning dentist, invariably are small in size and it is not uncommon for the installation of conventional dental equipment to take up most of the available space. The result is that there is considerable crowding and discomfiture both to the dentist and patient.

My invention is designed to overcome the above and other difficulties presently found in dental equipment for a dental operatory and to provide a dental operatory unit substantially complete in itself. It may be mounted above the floor of the office and may be moved completely over the patient when the patient is seated in a dentist's chair for maximum accessibility by the dentist. The unit then may be moved away from the chair in which the patient is sitting so that the patient may sit up or leave the chair with little difficulty.

The essence of my invention therefore is to provide a dental operatory unit mounted above the floor on which a dental chair is secured and movable from a position either over a patient in the dental chair and within easy reach of a dentist seated by the patient or movable away from the chair in which the patient is seated.

In drawings illustrating a preferred embodiment of my invention:

Figure 1:
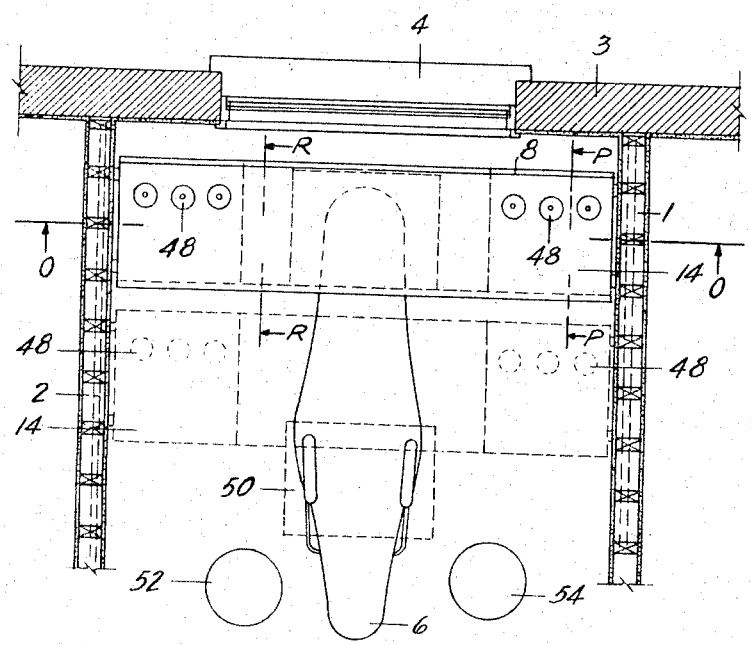
FIGURE 1 is a top plan view showing the dental chair located in a dental office with the dental operatory unit shown in solid lines away from the chair and in dotted lines in position over the chair.

With reference now to the top plan view of FIGURE 1, a dental office having parallel side walls 1 and 2 and an end wall 3 with a window 4 is illustrated.

A dental chair indicated generally at 6 is shown secured centrally in the room facing the window 4.

The dental operatory unit is indicated generally at 8 and consists of side cabinets 10 and 12 spaced apart and secured together by the horizontal top working surface 14.

The cabinets 10 and 12 are rectangular in form and may include a plurality of drawers 16 with an open shelf 18 at the bottom of each cabinet for magazines and the like.

The horizontal top working surface 14 is preferably formed of a scuff proof material such as fibreglass or the like and is formed with a back splash area 20 which merges smoothly into the working surface 14 and is formed with a rounded front surface 22 for maximum safety and ease of cleaning.

The dental operatory unit is mounted in horizontal tracks 24 and 26 positioned in the walls 1 and 2. The tracks 24 and 26 are inset into the walls 1 and 2 and are provided with angle irons rolling surface 28 to ensure smooth operation of the roller assemblies 30 which operate in the tracks.

Figure 2:
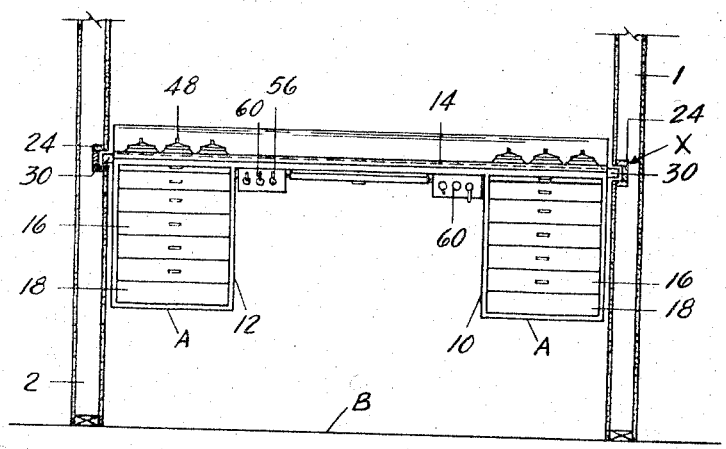
FIGURE 2 is a front view of the dental operatory unit illustrated in FIGURE 1.

It will be seen clearly on reference to FIGURE 2 that the bottoms A—A of the cabinets 10 and 12 are raised a considerable distance off the floor B. The raising of the bottoms A of the cabinets 10 and 12 is necessary so that they will not interfere with the feet and legs of a dentist seated by a patient in the chair 6.

The roller assemblies 30 each consist of rollers 32 and 34 operating in planes at right angles and attached to an angle bracket 36. The angle bracket 36 is in turn secured to the top working surface 14 through holding bolts or screws 38 positioned in slots 40 which allow adjustment of the rollers in the tracks 30.

Figure 3:
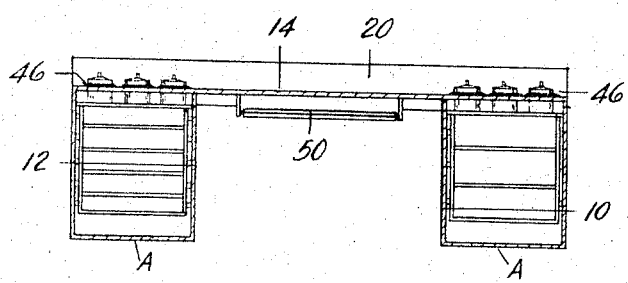
FIGURE 3 is a sectional front view taken substantially at the line O—O of FIGURE 1.
Figure 4:
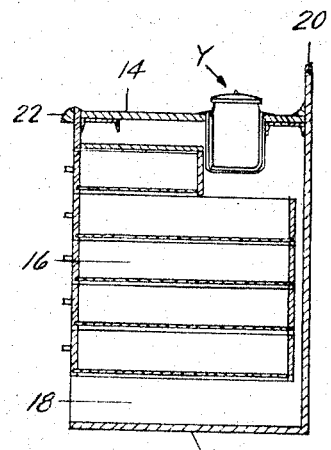
FIGURE 4 is a sectional side elevation taken substantially at the line P—P of FIGURE 1.

Preferably the working surface 14 is formed with a plurality of openings in which may be inserted metal containers 42 and gasket material 44 to receive glass canisters 46 or the like sealed with canister lids 48. As seen best in FIGURES 1 and 3, these canisters are positioned at the ends of the working surface 14 above the cabinets 12 and 10.

Between the cabinets 10 and 12 and below the working surface 8 there may be provided a tray 50 which is slidable with relation to the top 14 and which may be pulled out as illustrated in FIGURE 1 in the drawings to provide a convenient operating or instrument tray within easy reach of a dentist or dental assistant seated on the stools 52 or 54.

Figure 5:
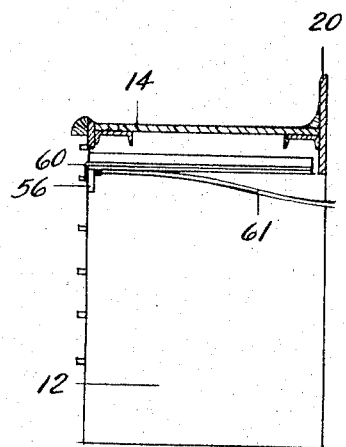
FIGURE 5 is a sectional side elevation taken at R—R of FIGURE 1.
Figure 6:
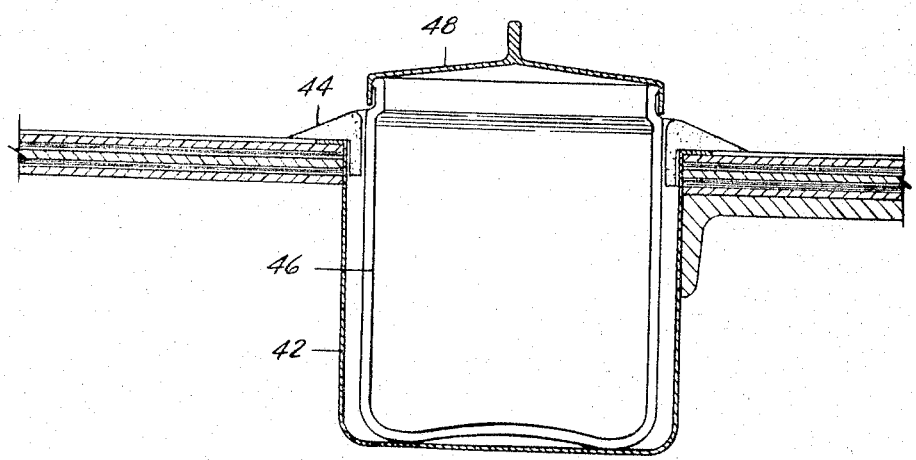
FIGURE 6 is an enlarged view of the detail Y of FIGURE 4.
Figure 7:
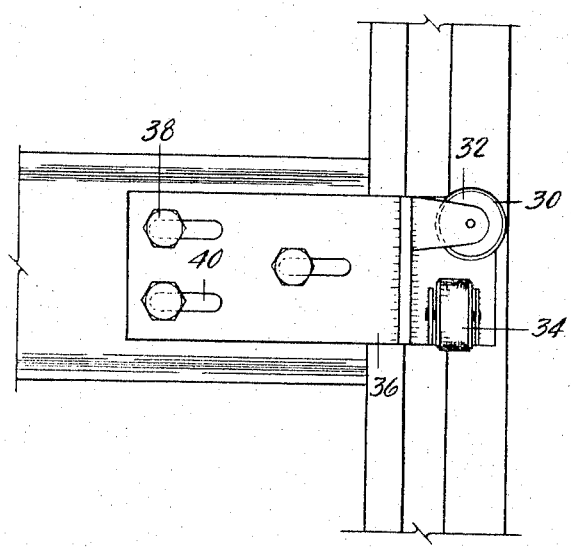
FIGURE 7 is an enlarged detail view illustrating the rollers of the operatory unit.
Figure 8:
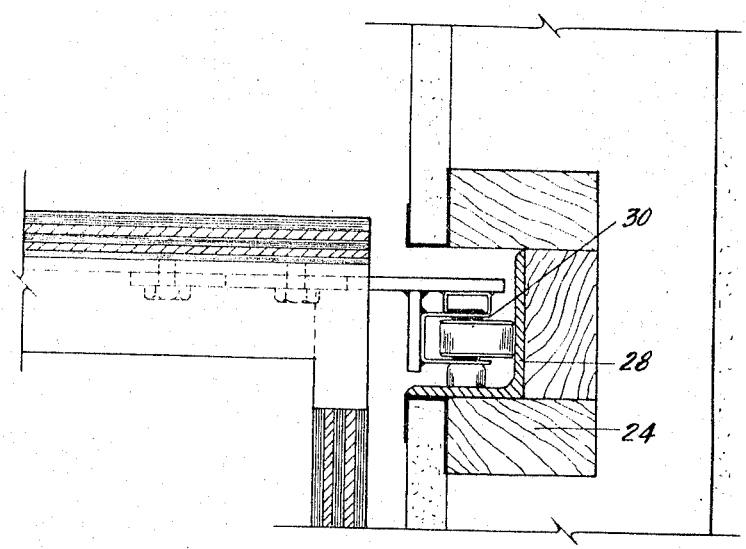
FIGURE 8 is an enlarged view of the detail X of FIGURE 2.
Figure 9:
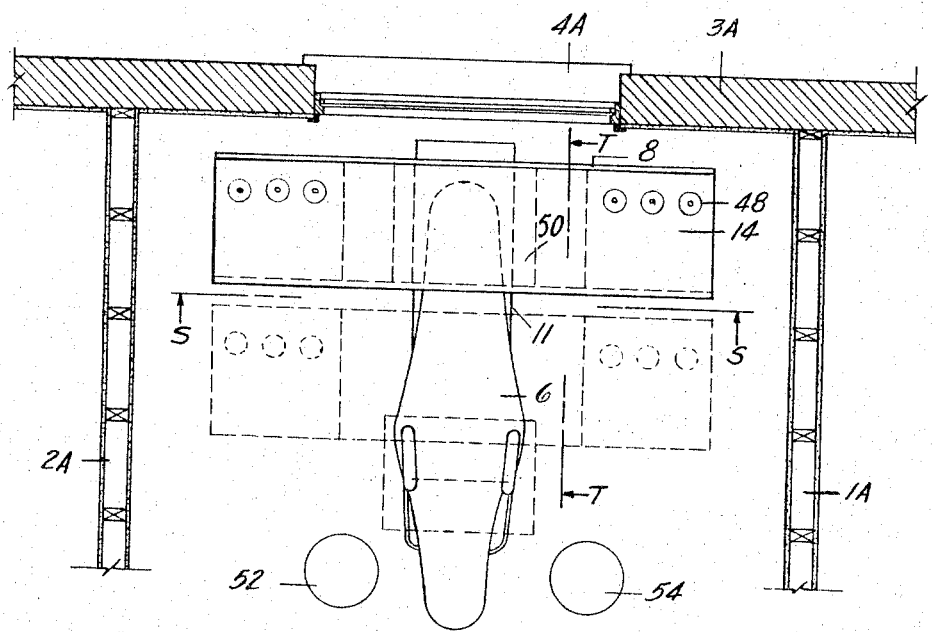
FIGURE 9 is a plan view showing an alternative embodiment of the device in a room of larger dimension than that illustrated in FIGURE 1.
Figure 10:
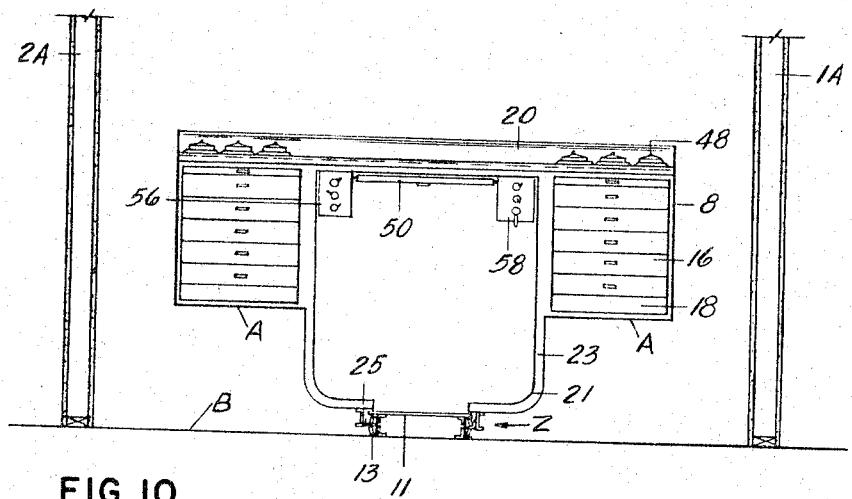
FIGURE 10 is a front plan view of the embodiment of FIGURE 9 taken substantially at the line S—S.
Figure 11:
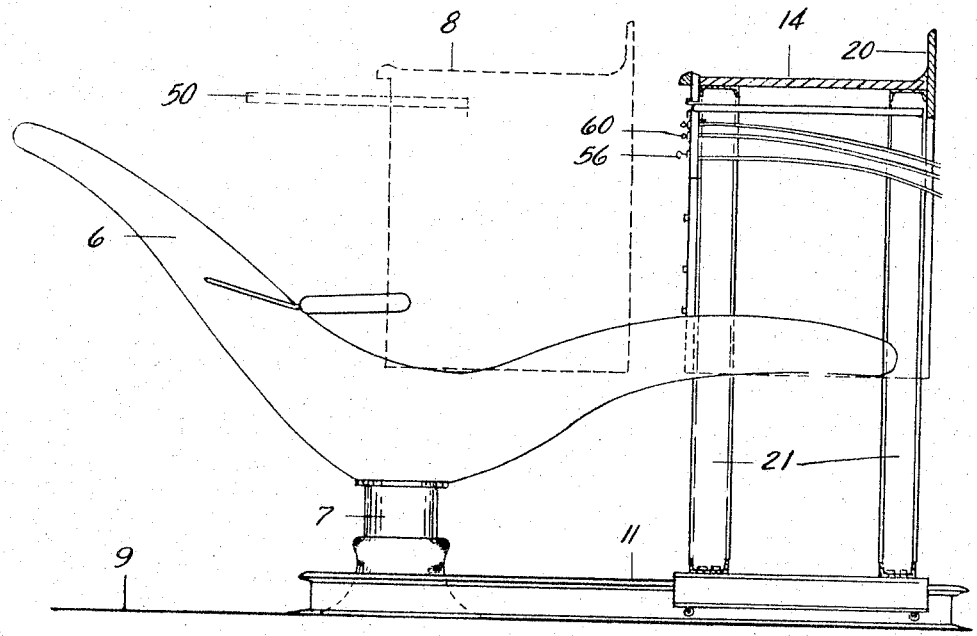
FIGURE 11 is a side view taken substantially at the line T—T of FIGURE 9.

I have found it preferable to locate the various dental instruments, as for example, air sprays, air rotor drills, suction syringes, etc., in a readily accessible position as illustrated at 56 and 58 in FIGURE 2 in the drawings. Preferably, these instruments, indicated generally at 60, would be provided with sufficient lengths of instrument hose 61 to allow them to be pulled through by the dentist or dental assistant into the correct operating position and, when released they would be returned back to the position illustrated in FIGURES 2 and 5 in the drawings.

In the embodiment illustrated in FIGURES 9 through 12 inclusive, the dental operatory unit 8 and dentist chair 6 are positioned in a dental office of somewhat larger dimensions including walls 1A and 2A and window wall 3A with a window 4A.

In this embodiment the pedestal 7 of the dentist chair is secured in customary fashion to the floor 9 of the dental office and a track mechanism indicated generally at 11 is secured on the floor and projects forwardly beneath the dental chair.

Figure 12:
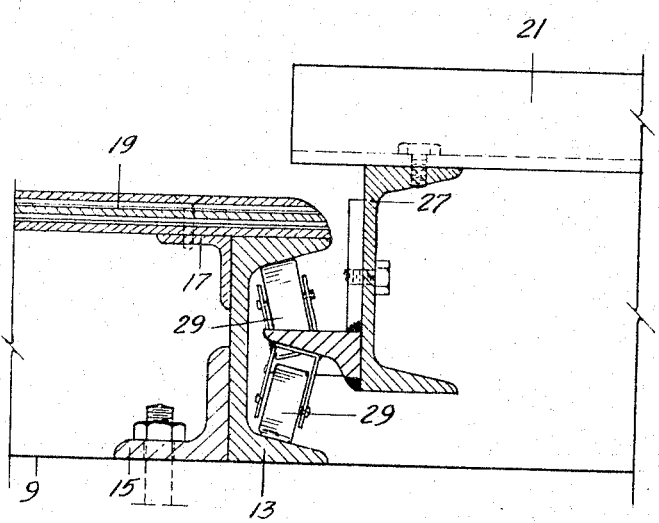
FIGURE 12 is an enlarged view illustrating the details Z of FIGURE 10.

The track mechanism 11 is best illustrated in FIGURE 12 in the drawings and consists of rails 13 which are spaced apart and secured through angle brackets 15 to the floor 9 and through additional angle brackets 17 to a covering 19 of plywood or other suitable material.

The dental operatory unit 8 is mounted for movement along the tracks 13—13 through the legs 21 which are secured at their one end 23 to the dental operatory unit and at their opposite ends 25 are fixed to channels 27 on which are mounted rollers 29. The rollers 29 engage in and travel along the rails 13 so that the operatory unit may be moved along the track into either of the positions illustrated in FIGURE 9 in the drawings.

In other respects the dental operatory unit in this embodiment is substantially identical to the unit illustrated in FIGURES 1 through 8 and described previously.

What I claim as my invention is:

In combination, walls and a floor, a dental patient's support chair for supporting a patient in the supine position above the floor and between the walls and at a height whereby a dentist seated alongside the patient may perform dental work on the patient without rising from the seated position, and a dental operatory unit having spaced cabinets interconnected by a horizontal top working surface, a slidable pull-out instrument tray positioned between the cabinets and below the said top and retractable powered dental tools located at each side of the said tray and below the said top, means suspending the said unit above the floor, such means comprising a substantially horizontal track secured to each of the walls and a roller assembly mounted at each end of the dental operatory unit adjacent the top working surface and adapted to engage rollably in a track whereby the unit may be moved from a position completely over a patient in the chair with a cabinet and powered tools at each side of the chair and with the said tray in the pulled-out position located immediately forward of and adjacent the mouth of the patient, to a position forward of the chair whereby the patient may be raised from the supine position to the seated position and may leave the chair from either side without hindrance from the dental operatory unit, the position of the unit when completely over the patient being such that a dentist seated at either side of the patient will have access to the contents of the contents of the cabinet and to the powered dental tools at that side of the patient and to the instrument tray without strain and without rising from the seated position and wherein the bottoms of the cabinets are sufficiently raised from the floor to not interfere with the feet and legs of a dentist seated alongside the patient.

References Cited by the Examiner

UNITED STATES PATENTS

| | | | |
|---|---|---|---|
| 1,396,864 | 11/1921 | Mayne | 312—332 X |
| 2,138,563 | 11/1938 | Voorhees | 32—22 |
| 2,575,661 | 11/1951 | Hickey | 211—1 |
| 2,843,444 | 7/1958 | Nelson | 312—341 |
| 2,928,696 | 3/1960 | Hiers | 308—3.8 |
| 3,000,681 | 9/1961 | Long | 312—194 |
| 3,094,363 | 6/1963 | Fremstad | 312—343 |
| 3,111,759 | 11/1963 | Shackelford | 32—22 |

FOREIGN PATENTS 23,031    1893    Great Britain.

CHANCELLOR E. HARRIS, Primary Examiner.

CLAUDE A. LE ROY, Examiner.